US010793312B2

(12) United States Patent
Roaks

(10) Patent No.: US 10,793,312 B2
(45) Date of Patent: Oct. 6, 2020

(54) AGITATING DEVICE FOR INFUSING FOOD FLAVORS INTO A SURROUNDING LIQUID AND AN INFUSION DEVICE HAVING SAME

(71) Applicant: Twistshake of Sweden AB, Vasteras (SE)

(72) Inventor: Vienar Roaks, Vasteras (SE)

(*) Notice: Subject to any disclaimer, the term of this patent is extended or adjusted under 35 U.S.C. 154(b) by 859 days.

(21) Appl. No.: 15/248,056

(22) Filed: Aug. 26, 2016

(65) Prior Publication Data
US 2018/0055255 A1 Mar. 1, 2018

(51) Int. Cl.
*A47J 43/27* (2006.01)
*B65D 1/02* (2006.01)
*B01F 15/00* (2006.01)
*B01F 13/00* (2006.01)
*B65D 47/06* (2006.01)
*B01F 13/10* (2006.01)

(52) U.S. Cl.
CPC ............ *B65D 1/0223* (2013.01); *A47J 43/27* (2013.01); *B01F 13/0022* (2013.01); *B01F 15/00512* (2013.01); *B01F 15/00876* (2013.01); *B65D 47/06* (2013.01); *B01F 2013/1083* (2013.01)

(58) Field of Classification Search
CPC ...... A47J 31/044; A47J 31/4403; A47J 31/20; A47J 43/27
USPC ............................ 99/279, 286, 287, 289, 280
See application file for complete search history.

(56) References Cited

U.S. PATENT DOCUMENTS

| 5,470,601 | A   | * | 11/1995 | Robertson | .......... | B65D 51/1616 |
| | | | | | | 426/111 |
| 7,578,231 | B2  | * | 8/2009  | Liu       | .......... | A47J 31/20 |
| | | | | | | 99/287 |
| 7,980,168 | B2  | * | 7/2011  | Maurer    | .......... | A47J 31/0631 |
| | | | | | | 210/350 |
| 8,051,766 | B1  | * | 11/2011 | Yu        | .......... | A47J 31/20 |
| | | | | | | 220/625 |
| 9,572,451 | B2  | * | 2/2017  | Verbeek   | .......... | A47J 31/3676 |
| 2007/0056447 | A1 | * | 3/2007 | Swartz    | .......... | A47G 19/2205 |
| | | | | | | 99/287 |
| 2007/0284396 | A1 | * | 12/2007 | Antal    | .......... | G01F 11/26 |
| | | | | | | 222/438 |
| 2008/0279040 | A1 | * | 11/2008 | Neilson  | .......... | B08B 3/04 |
| | | | | | | 366/176.1 |
| 2009/0223375 | A1 | * | 9/2009 | Verbeek  | .......... | B67D 1/0021 |
| | | | | | | 99/287 |

(Continued)

*Primary Examiner* — Dana Ross
*Assistant Examiner* — Ayub A Maye
(74) *Attorney, Agent, or Firm* — Ingram IP Law, P.A.

(57) ABSTRACT

An agitating device is provided that extracts food particles from food suspended in a liquid. The agitating device includes a rim, an interior portion having a plurality of apertures and a plurality of projections that extend from the interior portion, and a plurality of tabs that mechanically couple the rim and the interior portion. Furthermore, an infusion device is provided that infuses food flavors from food suspended in a liquid. The infusion device includes a lid, a container having an open end and a closed end, and the agitating device placed between the lid and the container. The plurality of projections extends from the interior portion toward the closed end of the container. The interior portion of the agitating device includes a surface that supports the plurality of projections oriented between 0° and 180° relative to the surface.

18 Claims, 4 Drawing Sheets

(56) References Cited

U.S. PATENT DOCUMENTS

| | | | | |
|---|---|---|---|---|
| 2009/0277335 A1* | 11/2009 | Baccetti | ............... | A47J 31/20 99/297 |
| 2010/0005979 A1* | 1/2010 | Baccetti | ............... | A47J 31/20 100/37 |
| 2010/0302897 A1* | 12/2010 | George | ............ | A47J 43/1025 366/130 |
| 2011/0215116 A1* | 9/2011 | Fuller | ............ | A47G 19/24 222/226 |
| 2011/0262600 A1* | 10/2011 | McGill | ............ | A23G 9/045 426/112 |
| 2014/0242240 A1* | 8/2014 | Billadeau | ......... | A47J 31/005 426/435 |
| 2015/0208849 A1* | 7/2015 | Melzer | ............ | A47J 31/005 99/287 |
| 2015/0208853 A1* | 7/2015 | Melzer | ............ | A23L 2/56 426/425 |

* cited by examiner

AGITATING DEVICE FOR INFUSING FOOD FLAVORS INTO A SURROUNDING LIQUID AND AN INFUSION DEVICE HAVING SAME

FIELD OF THE INVENTION

The invention relates to devices that infuse food flavors into a surrounding liquid and more particularly to agitating devices that extract solid food particles into a surrounding liquid, and still more particularly to agitating devices that extract solid food particles into a surrounding liquid in order to infuse food flavors when an infusion device with an agitating device therein is shaken.

BACKGROUND OF THE TECHNOLOGY

Known infusion devices infuse food flavors into a surrounding liquid by promoting surface contact between a solid food and a surrounding liquid. For example, known infusion devices suspend food, such as fruit, within a tube that extends longitudinally into a container such as a water pitcher or a water bottle. The tube may include multiple slits along a longitudinal direction that allow fluid contact between the surrounding liquid and the food within the tube. Typically, the food is cut into bite-sized pieces before it is inserted into the tube.

One drawback of known infusion devices is that food flavor is obtained only from an exterior portion of the food. A significant amount of food flavor is trapped within an interior portion of the food and does not directly contact the surrounding liquid. In other words, known infusion devices are not capable of extracting food flavor from an interior portion of the food. Another drawback of known infusion devices is that a significant amount of time is needed to infuse flavor from the food into the surrounding liquid. Other drawbacks exist.

DETAILED DESCRIPTION OF THE TECHNOLOGY

What is needed is an improved infusion device that extracts food particles from interior portions of food such as fruit. The extracted food particles increase an overall surface area of fruit that is exposed to the surrounding liquid, thereby infusing flavor into the surrounding liquid at a higher rate and concentration. In contrast, known infusion devices extract food flavors from only an exterior portion of food into the surrounding fluid. Thus, for an equivalent amount of food, the improved infusion device provides higher concentrations of fruit flavors at a faster speed, among other benefits.

Figure 1:
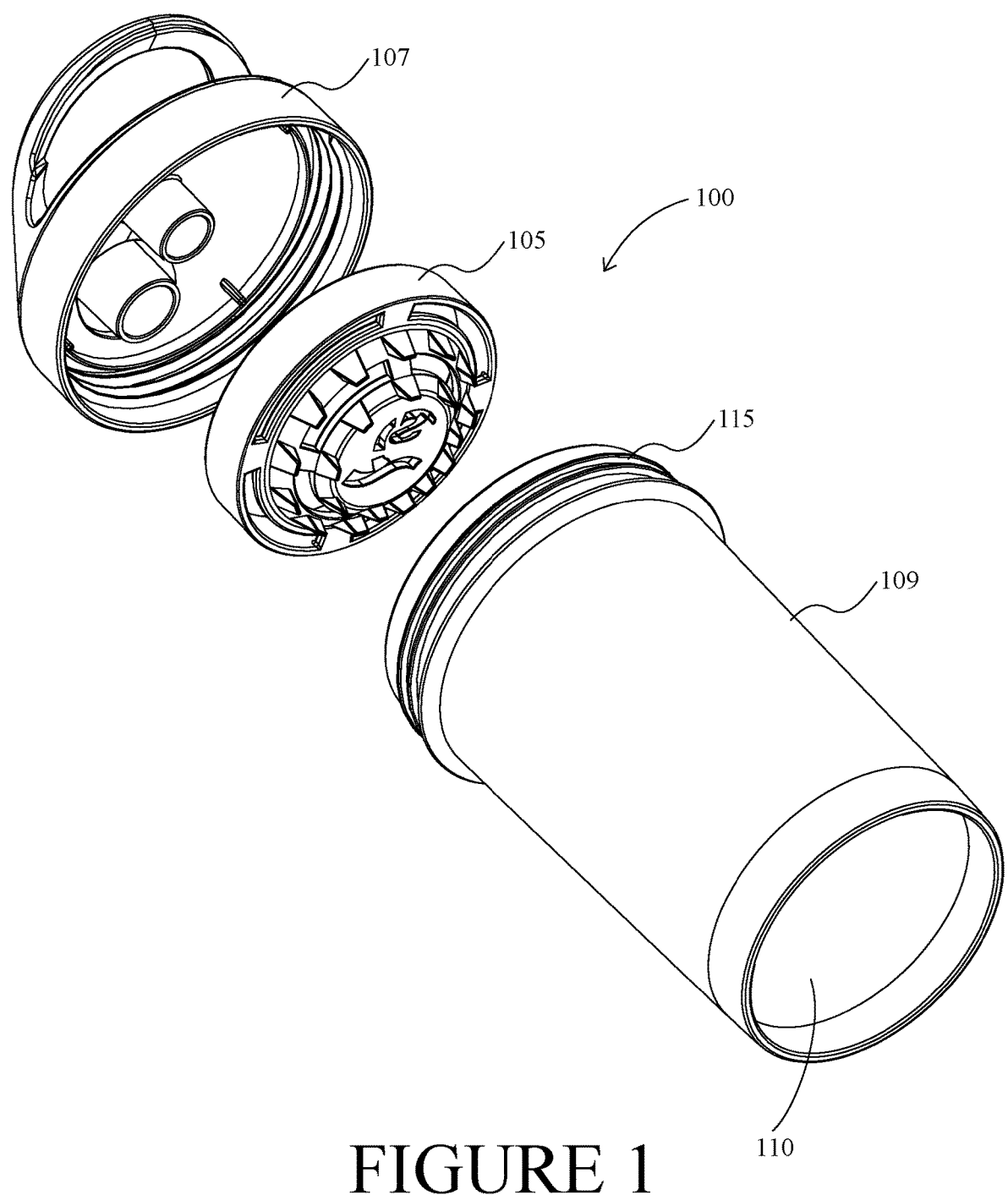
FIG. 1 illustrates a perspective view from below of an infusion device according to one example.

The improved infusion device includes an agitating device with projections that extract food particles from interior and exterior portions of food. According to one example, the improved infusion device may be shaken to enhance extraction of food particles from the interior and exterior portions of food. With reference to FIG. 1, the infusion device 100 may include an agitating device 105 that is placed between a lid 107 and a container 109. The lid 107 may include an aperture that dispenses fluid from the infusion device 100. The lid 107 may include a nipple, valve, sliding latch, or the like, that is placed within the aperture to regulate a rate of fluid flow therethrough. The container 109 may be cup-shaped, bottle shaped, or the like, to hold fluid therein. According to one example, the container 109 may include an open end, a closed end 110, and a tubular wall that joins the open and closed ends. The tubular wall includes an inner surface that, together with the closed end 110, define an interior of the container 109.

According to one example, the agitating device 105 may be positioned proximate to the open end of the container 109. According to one example, the inner surface of the tubular wall may include one or more protrusions that mechanically engage the agitating device 105 to prevent it from descending toward the closed end 110 of the container 109. According to another example, the inner surface of the tubular wall may include a tapered circumference that frictionally engages the agitating device 105 to prevent the agitating device 105 from descending toward the closed end 110 of the container 109. One of ordinary skill in the art will readily appreciate that other mechanisms may be used to maintain a relative position of the agitating device 105 within the infusion device 100. According to one example, the agitating device 105 may be maintained at any desired position within the infusion device 100. The agitating device 105 includes a circular periphery to match a shape of the interior of the container 109 and/or the lid 107. Alternatively, the agitating device 105 may include other periphery shapes including an oval shape, a triangular shape, a rectangular shape, a pentagonal shape, a hexagonal shape, or the like. An interior shape of the container 109 and/or the lid 107 may be adapted to match the peripheral shape of the agitating device 105.

According to one example, the container 109 may include threads 115 located proximate to the open end that securely fasten the lid 107 via a screwing action. Alternatively, the container 109 may include a lip that securely fastens the lid 107 via a friction fit. According to one example, the mechanism that fastens the lid 107 to the container 109 may provide a water-tight seal. One of ordinary skill in the art will readily appreciate that other mechanisms may be used to securely fasten the lid 107 onto the container 109. Furthermore, the mechanism used to securely fasten the lid 107 onto the container 109 may provide downward pressure on the agitating device 105. For example, the downward pressure may counteract any upward pressure exerted by fluid and food pieces against a bottom of the agitating device 105 during shaking. According to one example, the lid 107 and/or the container 109 may be configured to maintain a relative position of the agitating device 105 within the infusion device 100.

Figure 2:
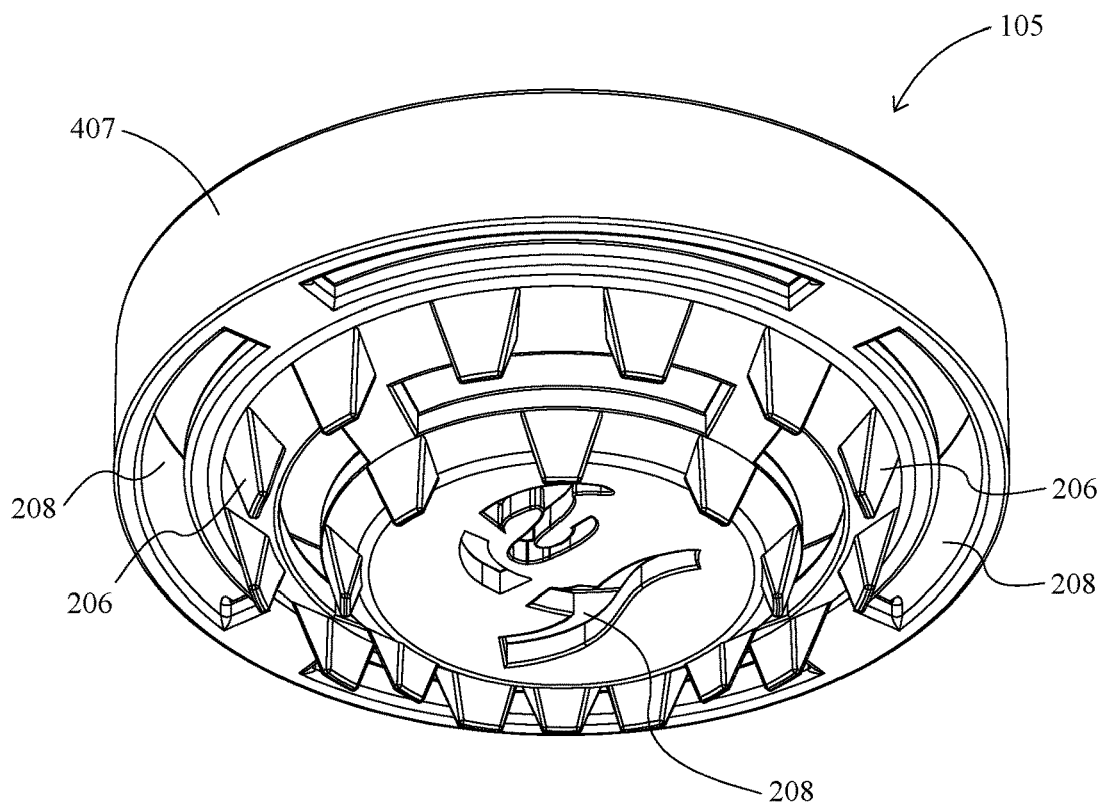
FIG. 2 illustrates a perspective view from below of an agitating device for infusing solid food particles into a liquid according to one example.
Figure 3:
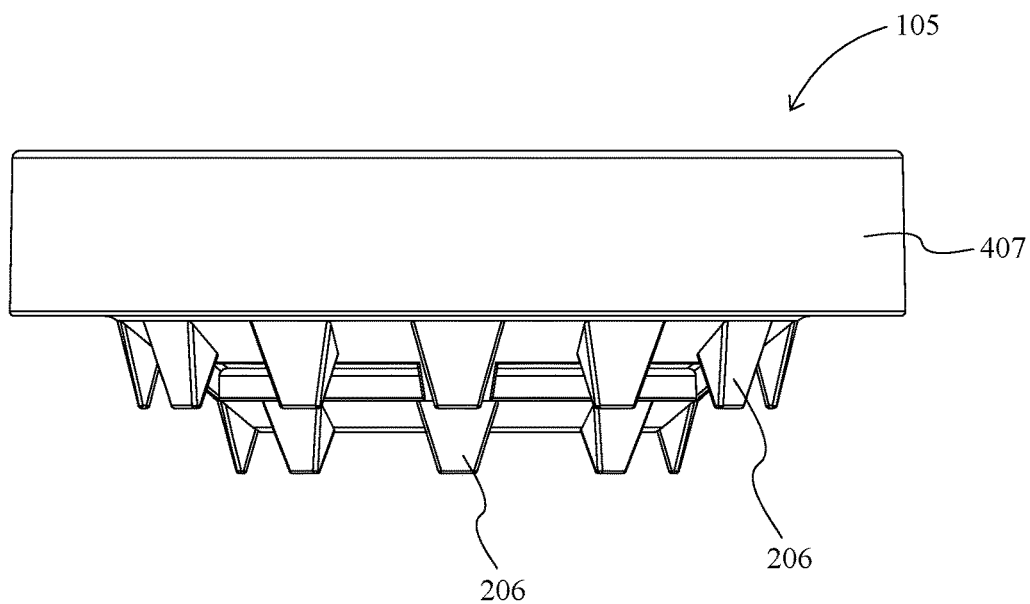
FIG. 3 illustrates a side view of the agitating device illustrated in FIG. 2.

FIGS. 2-6 illustrate examples of an agitating device 105 used for extracting food particles from interior and exterior portions of food. With reference to FIGS. 2 and 3, the agitating device 105 may include a truncated cone-shaped body having projections 206 that extend therefrom. With reference to FIG. 1, the projections 206 may be oriented to extend downward toward the closed end 110 of the container 109 when the agitating device 105 is installed in the infusion device 100.

Figure 4:
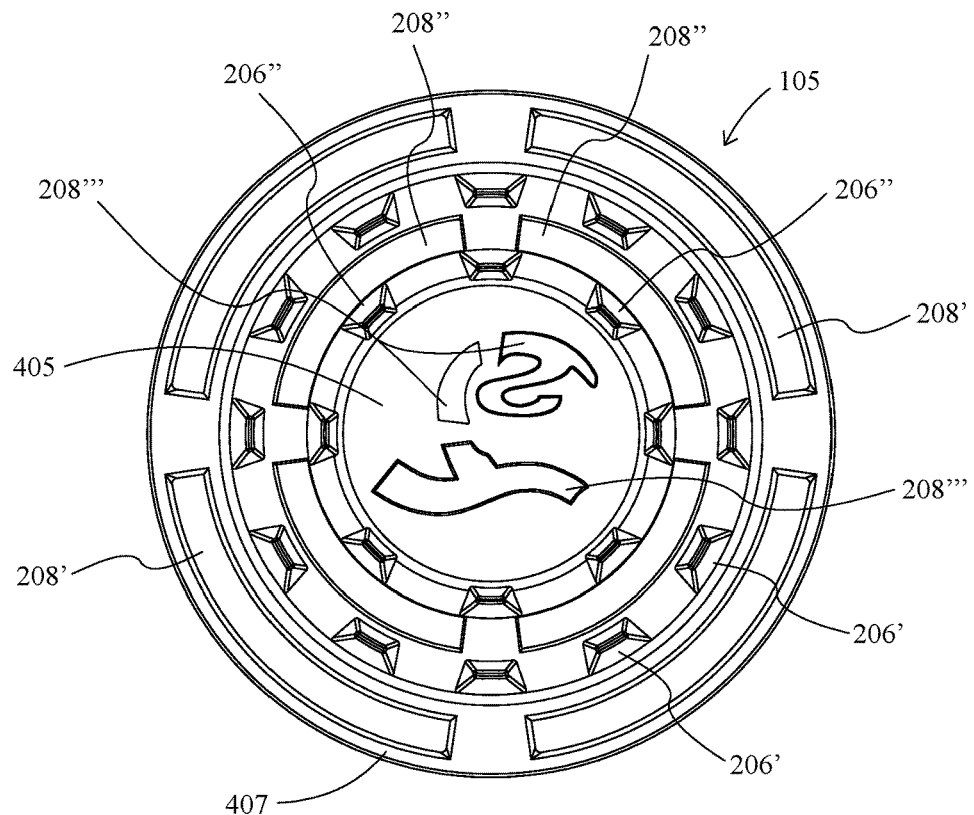
FIG. 4 illustrates a bottom view of the agitating device illustrated in FIG. 2.

FIG. 4 illustrates that the agitating device 105 may include concentric rings or bands of projections 206', 206" and apertures 208', 208" arranged along a circumferential direction. According to one example, the projections 206', 206" may be spaced apart from each other in corresponding concentric bands along the circumferential direction. According to one example, the projections 206', 206" may be equally spaced apart within their corresponding concentric bands. Alternatively, the projections 206', 206" may be unevenly spaced apart within their corresponding concentric bands. Still further, the projections 206', 206" may form a continuous ring along the circumferential direction. According to one example, the band defined by the projections 206' is spaced apart in a radial direction from the band defined by the projections 206".

According to one example, the apertures 208', 208" may be arranged in corresponding concentric bands and may be spaced apart from each other along the circumferential direction. According to one example, the apertures 208', 208" may be equally spaced apart within their corresponding concentric bands. Alternatively, the apertures 208', 208" may be unevenly spaced apart within their corresponding concentric bands. Still further, the apertures 208', 208" may form a substantially continuous aperture along the circumferential direction. According to one example, the band defined by the apertures 208' is spaced apart in a radial direction from the band defined by the apertures 208". According to one example, the truncated cone-shaped body may include a center portion 405 with one or more openings 208"'.

According to another example, the agitating device 105 may include projections and apertures arranged in a circumferential direction along a same band. The projections and apertures may be spaced apart from each other within the same band along a circumferential direction. According to one example, the projections and apertures may be equally spaced apart within the same band. Alternatively, the projections and apertures may be unevenly spaced apart within the same band. According to one example, the concentric bands defined by the projections and apertures may be spaced apart along a radial direction. According to another example, the apertures and projections may have substantially similar dimensions such as widths and/or lengths. According to another example, the apertures and projections may have different dimensions such as widths and/or lengths. One of ordinary skill in the art will readily appreciate that the projections and apertures of the agitating device 105 may be arranged in various configurations to extract food particles from interior and exterior portions of food and to promote mixing of a liquid within the infusion device 100.

According to yet another example, the agitating device 105 may include projections and apertures arranged in any configuration. For example, the projections and apertures may be spaced apart from each other in a grid pattern. According to one example, the projections and apertures may be equally spaced apart within the grid. Alternatively, the projections and apertures may be unevenly spaced apart within the grid. According to one example, the grid may include linear paths defined by the projections and apertures. Alternatively, the grid may include non-linear paths defined by the projections and apertures. According to another example, the apertures and projections may have substantially similar dimensions such as widths and/or lengths.

According to another example, the apertures and projections may have different dimensions such as widths and/or lengths. One of ordinary skill in the art will readily appreciate that the projections and apertures of the agitating device 105 may be arranged in various configurations to extract food particles from interior and exterior portions of food and to promote mixing of a liquid within the infusion device 100.

According to one example illustrated in FIGS. 2-4, the projections 206 have pointed ends to penetrate an outer surface of food. For example, the projections 206 may be wedge-shaped and may include a thick base that tapers to a pointed end. The projections 206 may be oriented at any angle relative to the agitating device 105. For example, the projections 206 may be substantially perpendicular to a plane defined by a surface that supports the projections on the agitating device 105. Alternatively, the projections 206 may be oriented between 0° and 180° relative to a surface that supports the projections on the agitating device 105. Furthermore, the surface that supports the projections may be angled or substantially perpendicular relative to an inner surface of a rim 407 of the agitating device 105.

According to one example, food such as fruit is deposited into the container 109 along with a liquid such as water, milk, or the like. The agitating device 105 is positioned within the container 109 and the lid 107 is securely fastened thereon. A user shakes the infusion device 100 causing liquid therein to flow between the container 109 and the lid 107 as it passes through the apertures 208 in the agitating device 105. Fruit suspended in the liquid is thrust against a bottom of the agitating device 105, which causes the pointed ends of the projections 206 to penetrate into the fruit. Occasionally, some fruit may avoid contact with the projections 206 and instead may be thrust against the center portion 405 and/or the apertures 208 of the agitating device 105. The fruit that strikes the projections 206 is shred while the fruit that strikes the center portion 405 and/or the apertures 208 is pressed. The shredded fruit particles become suspended in the surrounding liquid, while the pressed fruit secretes juice and any previously loosened fruit particles into the surrounding liquid. The suspended fruit particles and fruit juices infuse the liquid with fruit flavors. In this way, the technology provides an infusion device 100 with a higher concentration of fruit flavor at a faster rate as compared to known infusion devices. One of ordinary skill in the art will readily appreciate that the projections 206 may be any shape and/or orientation capable of shredding food. For example, the projections 206 may be cylindrical-shaped, pyramid-shaped, or the like, and may be oriented between 0° and 180° relative to a surface that supports the projections.

According to one example, the agitating device 105 includes an annular-shaped rim 407 that engages with the lid 107 and/or the container 109 to securely affix the agitating device 105 within the infusion device 100. The rim 407 is mechanically connected to interior portions of the agitating device 105 including the concentric bands of projections 206', 206" and apertures 208', 208" and the center portion 405 having one or more openings 208"'. For example, the rim 407 may be mechanically connected to the interior portions of the agitating device 105 through connection portions such as tabs 510 or the like. According to one example, the apertures 208 may be positioned proximate to the tabs 510 and may be oriented parallel to a periphery of the rim 407. For example, the tabs 510 may mechanically connect together the rim 407, the projection bands 206', 206", and the center portion 405. The tabs 510 may be positioned to define a plurality of apertures 208 between the rim 407, the projection bands 206', 206", and the center portion 405. For example, four (4) tabs 510' may be provided to define the four apertures 208'. Furthermore, four (4) tabs 510" may be provided to define the four apertures 208". The apertures 208', 208" and openings 208' allow fluid to flow through the agitating device 105 to promote mixing of any food particles introduced into the liquid such as by the projections 206.

According to one example, the apertures 208 may have an elongated shape and may extend in the circumferential direction. According to one example, four or fewer apertures may span a circumference of the agitating device 105. According to another example, the apertures 208 may include small dimensions such that twenty or more apertures may be needed to span a circumference of the agitating device 105. One of ordinary skill in the art will readily appreciate that any number of apertures 208 may be provided to allow a desired fluid flow through the agitating device 105.

According to one example, the apertures 208 promote mixing of the liquid, food particles, and/or powdered substances when the infusion device 100 is shaken. A slit width may be selected for the apertures 208 to prevent food particles and any powder lumps from reaching the lid aperture. Accordingly, selecting an appropriate slit width for the apertures 208 may prevent clogging of the nipple, valve, sliding latch, or the like, placed within the lid aperture. While the apertures 208 in FIGS. 2-6 are depicted with bent or curved rectangle shapes, one of ordinary skill in the art will readily appreciate that any aperture shape may be selected including an oval shape, a triangular shape, a rectangular shape, a pentagonal shape, a hexagonal shape, or the like. Furthermore, the apertures 208 located proximate to the rim 407 may have a larger dimension in the circumferential direction while the apertures 208 located proximate to the center portion 405 may have a smaller dimension in the circumferential direction. The openings 208''' located within the center portion 405 may have any shape including a custom shape, a slit shape, a grid pattern shape, or the like. The openings 208''' provided in the center portion 405 may include characteristics that enhance a rate of fluid flow through the agitating device 105. According to one example, the openings 208''' may include a hexagonal shape, a circular shape, an oval shape, a triangular shape, a rectangular shape, a pentagonal shape, or the like. According to one example, the projections 206 may be provided within the center portion 405.

Figure 5:
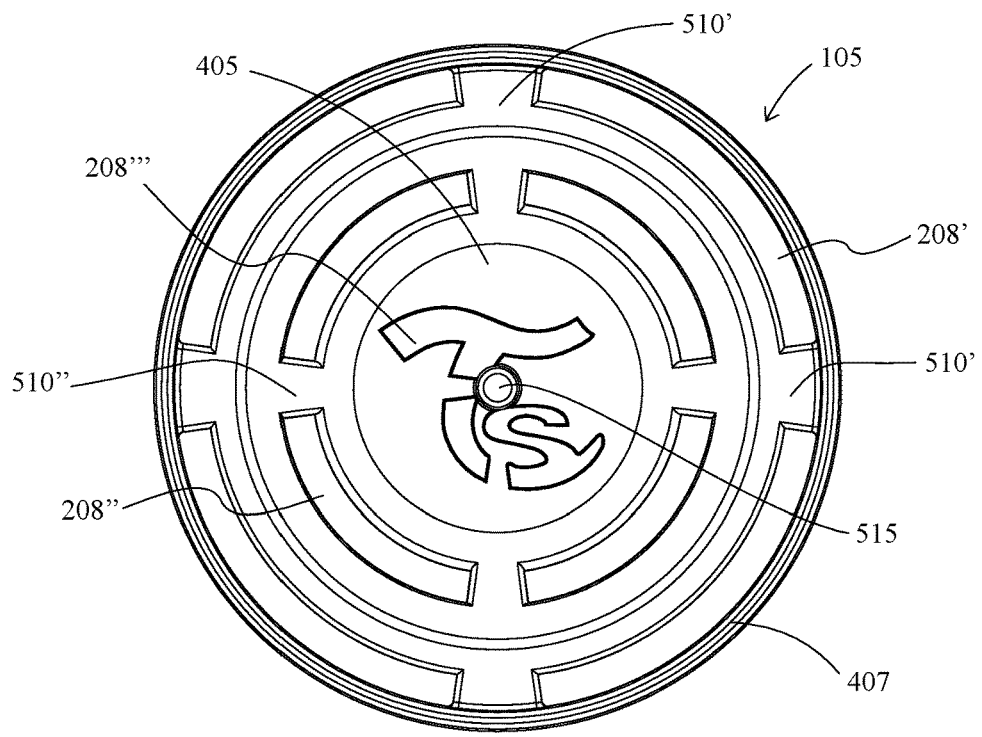
FIG. 5 illustrates a top view of the agitating device illustrated in FIG. 2.
Figure 6:
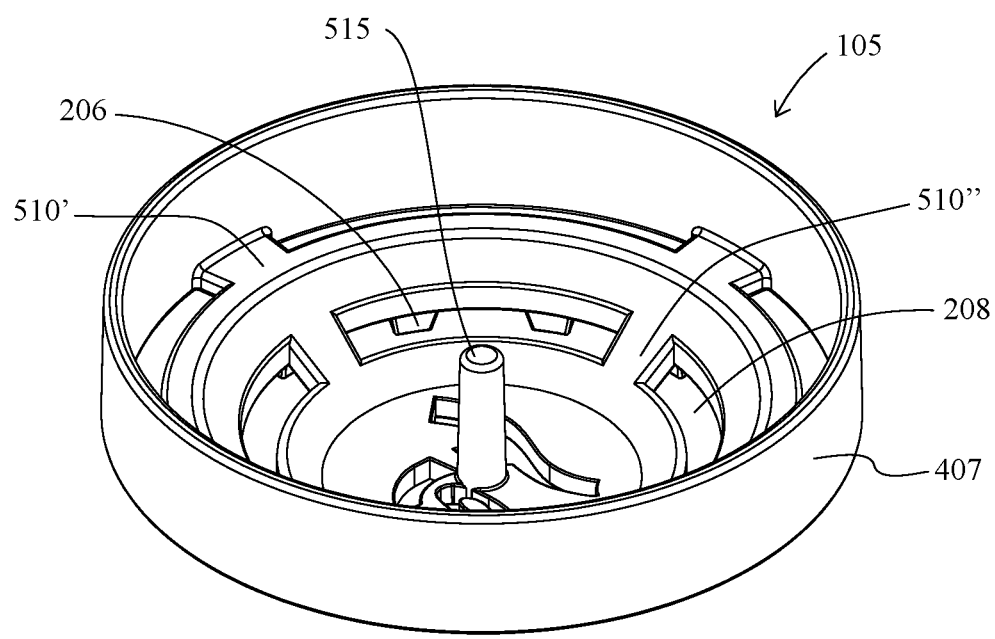
FIG. 6 illustrates a perspective view from above of the agitating device illustrated in FIG. 2.

According to one example illustrated in FIGS. 5 and 6, the agitating device 105 may include a pick up spike 515 located within the center portion 405 to facilitate removal of the agitating device 105 from the infusion device 100. The top of the pick up spike 515 may be rounded to blunt the contact surface. While the agitating device 105 is depicted as having an inner portion with a truncated cone-shape, one of ordinary skill in the art will readily appreciate that the agitating device 105 may include an inner portion having any of several different shapes. For example, the agitating device 105 may include an inner portion having a planar disc-shape, a triangular-shape, truncated triangular-shape, or the like.

The agitating device 105 may be formed of a rigid material such as plastic. For example, the agitating device 105 may be formed from Bisphenol A (BPA) and 2-ethylhexyl (DEHP) free plastic or a similar material. The agitating device 105 may be formed using a single piece construction by casting in a mold, for example.

It will be readily understood by those persons skilled in the art that this technology is susceptible to broad utility and application. Many examples and adaptations of the technology other than those herein described, as well as many variations, modifications and equivalent arrangements, will be apparent from or reasonably suggested by this technology and foregoing description thereof, without departing from the substance or scope of the invention.

While the foregoing illustrates and describes examples of this technology, it is to be understood that the technology is not limited to the construction disclosed herein. The technology can be embodied in other specific forms without departing from its spirit or essential attributes.

What is claimed is:

1. An agitating device comprising:
   a rim;
   an interior portion having a plurality of apertures and a plurality of projections that extend from the interior portion; and
   a plurality of tabs that mechanically couple the rim and the interior portion, wherein a first set of the plurality of apertures are arranged proximate to the rim along a circumferential direction, a first set of the plurality of projections are arranged proximate to the first set of the plurality of apertures along the circumferential direction, a second set of the plurality of apertures are arranged proximate to the first set of the plurality of projections along the circumferential direction, a second set of the plurality of projections are arranged proximate to the second set of the plurality of apertures along the circumferential direction, and wherein the agitating device is configured to extract food particles from food suspended in a liquid.

2. The agitating device according to claim 1, wherein the plurality of projections includes a wedge-shape with a thick base that tapers to a pointed end.

3. The agitating device according to claim 1, wherein the interior portion includes a surface that supports the plurality of projections and the plurality of projections are oriented between 0° and 180° relative to the surface.

4. The agitating device according to claim 1, wherein the plurality of apertures are elongated and span a circumference of the rim.

5. The agitating device according to claim 1, wherein the interior portion includes a truncated cone-shape, a planar disc-shape, or a truncated triangular-shape.

6. The agitating device according to claim 5, further comprising a center portion defined at a center of the interior portion, the center portion including one or more openings.

7. The agitating device according to claim 1, wherein the plurality of tabs are positioned to define the plurality of apertures.

8. An infusion device comprising:
   a lid;
   a container having an open end and a closed end; and
   an agitating device placed between the lid and the container, the agitating device comprising:
      a rim;
      an interior portion having a plurality of apertures and a plurality of projections that extend from the interior portion toward the closed end of the container; and
      a plurality of tabs that mechanically couple the rim and the interior portion, wherein a first set of the plurality of apertures arranged proximate to the rim along a circumferential direction, a first set of the plurality of projections arranged proximate to the first set of the plurality of apertures along the circumferential direction, a second set of the plurality of apertures arranged proximate to the first set of the plurality of projections along the circumferential direction, a second set of the plurality of projections arranged proximate to the second set of the plurality of apertures along the circumferential direction, and wherein the infusion device is configured to infuse food flavors from food suspended in a liquid.

9. The infusion device according to claim 8, wherein the plurality of projections includes a wedge-shape with a thick base that tapers to a pointed end.

10. The infusion device according to claim 8, wherein the interior portion of the agitating device includes a surface that supports the plurality of projections, the plurality of projections being oriented between 0° and 180° relative to the surface.

11. The infusion device according to claim 8, wherein the plurality of apertures are elongated and span a circumference of the rim.

12. The infusion device according to claim 8, wherein the interior portion of the agitating device includes a truncated cone-shape, a planar disc-shape, or a truncated triangular-shape.

13. The infusion device according to claim 12, further comprising a center portion defined at a center of the interior portion, the center portion including one or more openings.

14. The infusion device according to claim 8, wherein the plurality of tabs are positioned to define the plurality of apertures.

15. The infusion device according to claim 8, wherein the lid includes a lid aperture that dispenses fluid, the lid aperture having a nipple, a valve, or a sliding latch therein to regulate a rate of fluid flow therethrough.

16. The infusion device according to claim 8, wherein the container includes one or more protrusions that mechanically engage the agitating device to prevent the agitating device from descending toward the closed end of the container.

17. The infusion device according to claim 8, wherein the agitating device includes a substantially similar periphery shape as compared to the open end of the container.

18. The infusion device according to claim 15, wherein the container is bottle-shaped and the lid aperture includes the nipple to regulate a rate of fluid flow therethrough.

* * * * *